United States Patent [19]

Kinoshita

[11] Patent Number: 5,266,837
[45] Date of Patent: Nov. 30, 1993

[54] APPARATUS FOR ARTIFICAL WIND POWER GENERATION

[76] Inventor: Mikio Kinoshita, 171-1-403, Kitami; Kata, Takatsu-Ku, Kawasaki-shi, Kanagawa-Ken, Japan

[21] Appl. No.: 857,483

[22] Filed: Mar. 25, 1992

[30] Foreign Application Priority Data

Mar. 27, 1991 [JP] Japan ................................. 3-85950

[51] Int. Cl.⁵ ..................... F03D 11/04; F03D 3/04
[52] U.S. Cl. ........................................ 290/54; 290/43; 290/44; 290/55
[58] Field of Search .................... 138/139; 290/43, 44, 290/54, 55; 454/46

[56] References Cited

U.S. PATENT DOCUMENTS

| 4,250,609 | 2/1981 | Beaudoin | 138/139 |
| 4,265,166 | 5/1981 | Parker et al. | 454/46 |

FOREIGN PATENT DOCUMENTS 45202 2/1982 European Pat. Off.

OTHER PUBLICATIONS

Kinoshita–"Solar/Wind Power in the Troposphere", Macro Review, vol. 3, No. 1 (1990), pp. 41–44.
Lautenschlager, et al., "New Results from the Solar Chimney Prototype, etc.", European Wind Energy Conference, Oct. 1984, pp. 231–233.
Richards–"Hot Air Starts to Rice Through Spain's solar Chimney", Electrical Review, vol. 210, No. 15, Apr. 1982, pp. 26–27.
Mullet, "The Solar Chimnet, etc.", International Journal of Ambient Energy, vol. 8, No. 1, Jan. 1987, pp. 35–40.

Primary Examiner—A. D. Pellinen
Assistant Examiner—Robert Lloyd Hoover
Attorney, Agent, or Firm—Wenderoth, Lind & Ponack

[57] ABSTRACT

An apparatus for artificial wind power generation comprises a container which is constructed of, or supported by, a membrane structure formed of a plurality of gastight cells. The container is provided with an air inlet disposed at a lower part of the container for allowing heated and/or humidified air to be introduced, and an air outlet disposed at an upper part of the container. The apparatus is also provided with a wind power conversion mechanism, and an electric power generator.

6 Claims, 3 Drawing Sheets

APPARATUS FOR ARTIFICIAL WIND POWER GENERATION

BACKGROUND OF THE INVENTION

The present invention relates to an apparatus for artificial wind power generation. It has been proposed to provide an apparatus for artificial wind power generation using updraft energy which is generated by introducing air, which is hotter and has lower density than the air in the surrounding atmosphere, into a container such as a chimney. Efficiency of the apparatus for artificial wind power generation strictly depends on the altitude difference between an air inlet and an air outlet. Therefore, it is important to construct a low cost container which can reach great heights. It has been, however, difficult to construct a low cost container which both has great height and can tolerate strong winds.

SUMMARY OF THE INVENTION

Accordingly, it is an object of the present invention to provide a substantially new apparatus for artificial wind power generation for supplying large scale electrical power generation which is important for resolving global environmental problems, by realizing a container of great height.

The object is achieved in a first embodiment of the present invention by an apparatus for artificial wind power generation, that is, an apparatus for artificial wind power generation comprising: a container into which heated and/o humidified air is introduced; an air inlet disposed at a lower part of the container; an air outlet disposed at an upper part of the container; a wind power conversion means, such as a windmill, disposed in the container in the vicinity of the air inlet or in the vicinity of the air outlet in order to convert wind energy into kinematic energy; an electric power generation means for generating electric power from the kinematic energy; and wherein the container comprises a membrane structure formed of a plurality of interconnected pressurized gastight cells.

According to a first embodiment of the present invention, the container has a plurality of gastight cells which are pressurized with gas relative to the surrounding atmosphere The walls of the cells are made of a film-like material which can tolerate tensile stress. The pressure of the gas retained in the cells creates tensile stress on the walls, so as to cause the individual cells, and thus the overall membrane structure, to hold its shape. Since the walls forming the cells are structurally interconnected, the membrane structure, as a whole, has sufficient rigidity to withstand external force. Therefore, it turns out to be possible to construct the membrane structure with dimensions which greatly exceed the dimensions possible for an individual gastight cell. Therefore, the container can be constructed to great heights by being either composed of or supported by the membrane structure formed of the interconnected pressurized gastight cells. The shape of the membrane structure can be distorted within a permitted distortion range which depends on the gas pressure in each cell, the surrounding atmospheric pressure, wind velocity in the surrounding atmosphere, and the weight imposed on the membrane structure. The distortion range is selected such that the stress imposed on the cell walls does not exceed the proof stress of the cell walls. An air inlet is formed at a lower part of the container, and an air outlet is formed at an upper part of the container.

Heated and/or humidified air can be introduced into the container through the air inlet, and because the air is heated and/or humidified relative to the surrounding atmosphere, the air will rise in the container and be exhausted through the air outlet. This creates updraft in the container which is then converted into mechanical (or kinematic) energy by a wind power conversion means disposed in the vicinity o the air inlet or in the vicinity of the air outlet An electric power generation means is operably coupled with the wind power conversion means to convert the mechanical (or kinematic) energy to electric power.

The object of the present invention is achieved in a second embodiment of the present invention by an apparatus for artificial wind power generation, wherein a plurality of interconnected pressurized gastight cells have annular shapes or the like and are each arranged in surrounding relation to a container area.

Also in the second embodiment, gas is retained in the cells and is pressurized with respect to the surrounding atmosphere. The shape of each of the cells is maintained by the pressure the gas puts on the film-like walls which constitute the cells. A plurality of cells are structurally interconnected to form a unified structure. Therefore, it turns out to be possible to form a unified structure which exceeds the dimension of the individual cells. Consequently, a container of great height can be composed of a plurality of cells forming a membrane structure, or can be supported by a plurality of cells forming the membrane structure. The shape of each cell is distorted in accordance with the pressure of the gas retained in each membrane structure, the wind velocity of the surrounding atmosphere, and the weight imposed on the plurality of cells, within a permitted range, where the stress on the cell walls does not exceed the proof stress. An air inlet is disposed at the lower part of the container, and an air outlet is disposed at the upper part of the container. Air which is heated and/or humidified is introduced into the container through the air inlet. Because the air is heated and/or humidified relative to the surrounding atmosphere, the air rises in the container and is exhausted from the air outlet. Consequently, an updraft is created in the container. The energy of the updraft is converted into mechanical (or kinematic) energy by the wind power conversion means such as a windmill, and is used for electric power generation by the electric power generation means.

DESCRIPTION OF THE PREFERRED EMBODIMENTS

Figure 1:
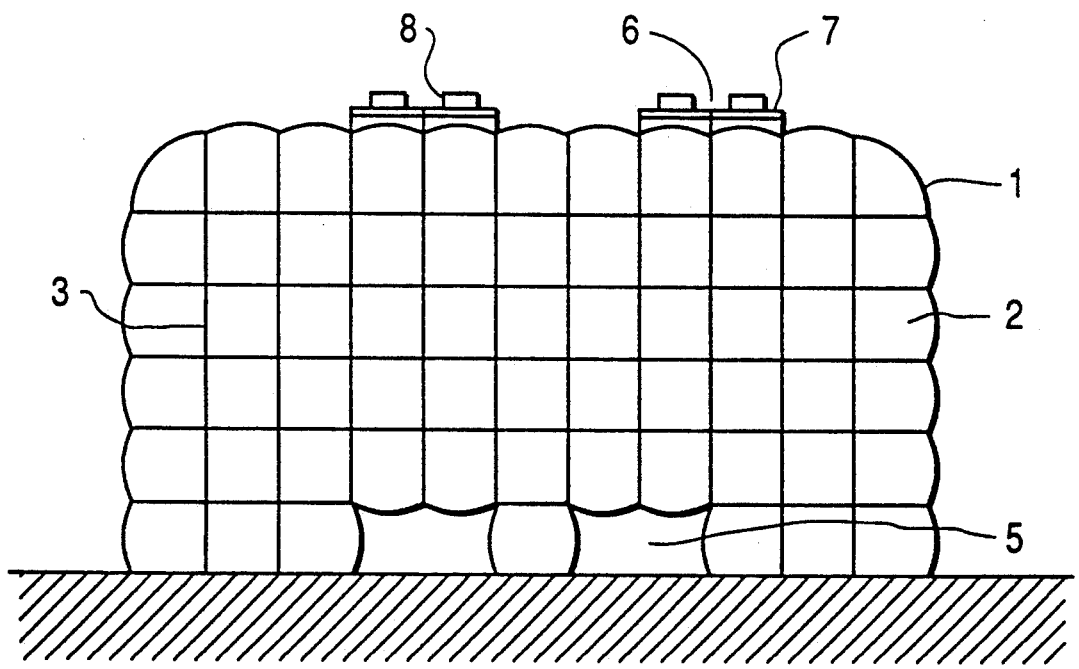
FIG. 1 is a schematic view of a first embodiment of the present invention.
Figure 2:
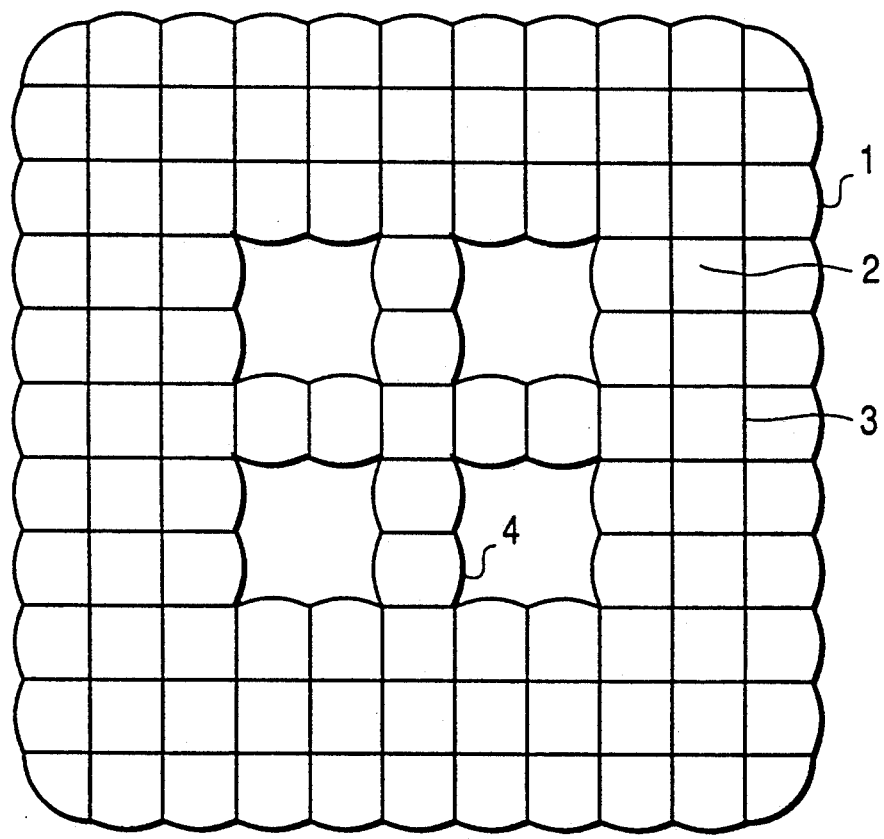
FIG. 2 is a schematic section view parallel to the horizon for the first embodiment of the present invention.

A first embodiment of the present invention will be explained hereinunder with reference to FIGS. 1 and 2. In FIGS. 1 and 2, there is shown a membrane structure 1 having a plurality of airtight closed spaces (or cells) 2. Each of the cells 2 is formed of film-like walls 3 which are made of film-like material and can withstand tensile stress. In the embodiment of FIGS. 1 and 2, there are 588 cells 2 in the membrane structure 1. Each of the cells 2 is cube-shaped when no external forces are imposed thereon, and the cells 2 are interconnected with one another at intervals where the intervals preferably equal the lengths of the cell walls. With reference to a system of rectangular coordinates, the walls 3 of the cells 2 are perpendicular to the X-axis, the Y-axis, or the Z-axis. The walls 3 are structurally interconnected at their edges. Consequently, the cells form an integrated membrane structure 1.

The base material of the walls 3 is selected from among steel board, and cloths made of high-tension steel wire, carbon fiber, or Kevlar-fiber, and the base material is coated by gastight material such as rubber or glass epoxy board. The means for structurally interconnecting the walls 3 is selected in accordance with the base material of the walls 3. For example, rivets or welds can be utilized for steel boards or high-tension steel cloths and other means are selected for other base materials. Connection with rope is also possible.

Although the preferred shape of the cells 2 is cubic, other shapes can be utilized. For example, the membrane structure can be formed of hexagonal columns or combinations of different cells.

Gas in the cells 2 is compressed relative to the surrounding atmosphere such that outward forces are exerted on the walls 3, thereby rigidifying the membrane structure 1 and allowing it to withstand external forces such as wind forces. The ordinary range of the pressure difference between the pressure in the cells 2 and the surrounding atmospheric pressure, is several kPa to several tens of kPa. The pressure difference is, of course, sufficient to provide rigidifying forces which are greater than the forces that a strong wind would cause against the structure 1. The size of the individual cells 2 is limited on the basis of the tensile stress, for example, caused by the specific gravity of the walls 3. A giant structure can, however, be realized according to the present invention by interconnecting the plurality of individual cells 2. In use (i.e. when the cells 2 are interconnected to form the structure 1), the shape of each cell 2 is somewhat distorted from that of a perfect cube (assuming a cube-shaped cells are being utilized). Especially for the cells at the outer edges of the structure, the distortion can be relatively large such that the side surfaces become smooth curved surfaces. In the preferred embodiment, however, the walls 3 are constructed so that the distortion is small.

It is possible to fold up the membrane structure 1 if the gas in the plurality of closed spaces 2 is evacuated. Although various gases can be retained in the plurality of closed spaces 2, air is normally used. It is also possible to use hydrogen, helium, nitrogen gas, or mixtures thereof where buoyancy is desired. Heating of the plurality of closed space 2 also contributes to the buoyancy thereof. As a means for heating the plurality of closed spaces, there can be utilized means for using solar heat, such as heat insulators for the walls 3 and selective-reflection films or selective-absorption films for the surfaces of the walls 3. Increasing the buoyancy of the closed spaces 2 reduces the pressure on the lower part of the membrane structure 1, and an overall reduction in weight is achieved. Further, it is contemplated to provide gas blasting means, exhaust means, or temperature control means, in order to control the pressure in the plurality of closed spaces in accordance with variations in weather conditions such as atmospheric pressure and wind velocity.

It is possible to reduce the wind force acting on the structure 1 by providing the membrane structure with fluid lines (i.e. by making it more aerodynamic), or by making the surface of the membrane structure rough. It is also possible to structurally connect the membrane structure 1 to the ground, although frictional forces will act between the membrane structure 1 and the ground.

The membrane structure 1 can itself form a container 4 (as shown in the drawings) or can be utilized to support a container. An air inlet 5 is disposed at a lower part of the container 4, and an air outlet 6 is disposed at an upper part of the container 4. Heated and/or humidified air can be introduced through the air inlet 5, and because the air is heated and/or humidified relative to the surrounding atmosphere, it rises in the container 4 and is exhausted from the air outlet 6. The energy of the updraft is converted into mechanical (or kinematic) energy by a wind power conversion means 7 which is disposed in the container 4 in the vicinity of the air outlet 6 or in the vicinity of the air inlet 5. An electric power generation means 8 is operably coupled with the wind power conversion means to convert the mechanical energy into electrical power. Darrieus-type windmills, axial fans, mixed flow fans, centrifugal fans, or the like can be selected as the wind power conversion means 7. In this embodiment, both the electric power generation means 8 and the wind power conversion means 7 are disposed on the upper part of the container 4 in the vicinity of the air outlet 6. It is possible to reduce torque imposed on the membrane structure by the wind power conversion means by using a plurality of reverse rotation windmills. Further, it is possible to reduce the forces due to the weight of electric power generation means 8 and the wind energy conversion means 7 on the membrane structure 1, by using additional balloons. As for the pressure in the container 4, it is positive relative to the surrounding atmosphere. The generated electric power is transmitted by an appropriate electric power transmitting means. Efficiency of the electric power generation is enhanced when the wind is strong in the upper sky. As for another example not shown in the drawing figures, wind power conversion means can be disposed at the lower part of the container where pressure in the container is lower than the pressure of the surrounding atmosphere.

Figure 3:
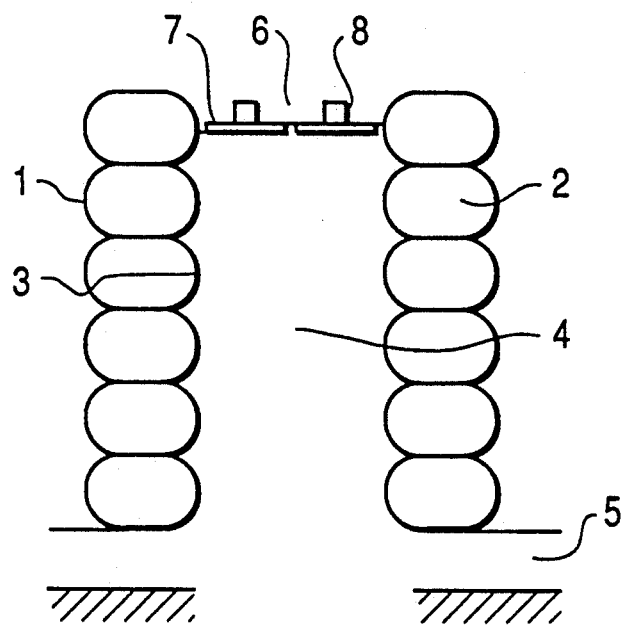
FIG. 3 is a cross-sectional view of a second embodiment of the present invention.

FIG. 3 is a schematic cross-sectional view of a second embodiment of the present invention. This embodiment is similar to the first embodiment in that a membrane structure is formed by a plurality of interconnected pressurized gastight cells 2. However, in the FIG. 3 embodiment, the membrane structure 1 is formed of cells 2 having various shapes, including spheres, ellipses, doughnut-shapes (i.e. annular rings), and the like. In this second embodiment, doughnut-shaped membrane structures are preferred, as shown in FIG. 3. A plurality of the cells 2 are structurally interconnected. The base material and joint means are such as described in connection with the first embodiment. The interconnected cells 2, as a whole, are sufficiently rigid to withstand external forces, and it is possible to separate some cells 2 from the remaining cells 2, such that construction and maintenance of the giant membrane structure I can be performed with ease. As in the first embodiment, the container can be either composed of the membrane structure or supported by the membrane structure. It is also possible to construct various types of structural shapes by combining various types of cells 2 as mentioned above. It is also possible to construct pyramid-like giant structures by closely packing spherical cells together, and a tube-like container can be supported by the cells.

Figure 4:
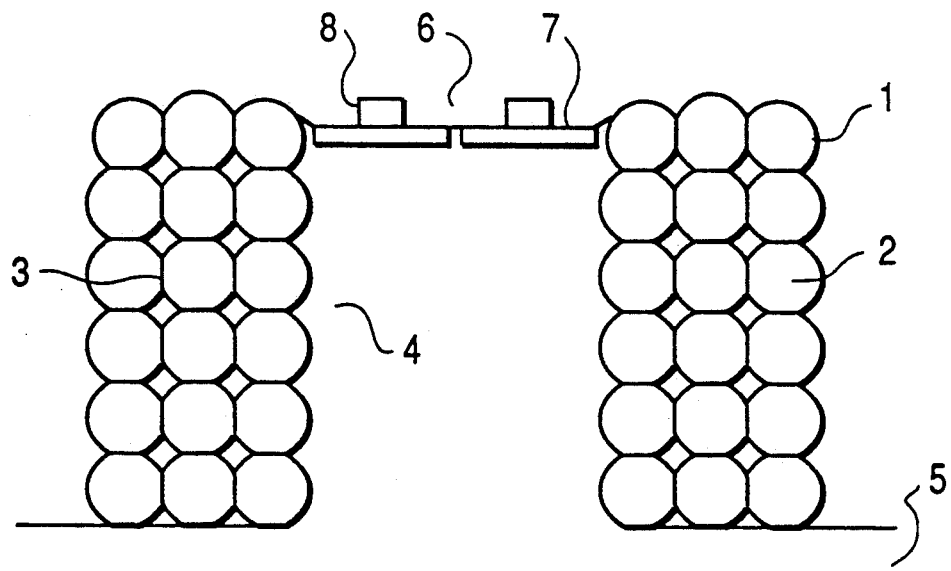
FIG. 4 is a cross-sectional view of a third embodiment of the present invention.
Figure 4:

FIG. 4 is a schematic cross-sectional view of a third embodiment according to the present invention. There are a plurality of doughnut-shaped cells 2 which are interconnected in such a manner that the internal stress among the plurality of cells 2 is compressive. In a natural state, the cells 2 are influenced by compressive stresses along the vertical direction due to gravity, and the cells are interconnected such that they are further compressed by these forces. Similarly compressive forces act along the horizontal direction due to the interconnection of the cells 2. In this manner, the rigidity of the plurality of membrane structures is, as a whole, further increased, and the distortion of the plurality of cells is greatly suppressed even when a strong horizontal force is imposed by a strong wind.

As for an installation site for the apparatus described above, the apparatus according to the present invention may be installed on the ocean, and it is possible to generate electric power by using air which has been heated and/or humidified by the warm sea surface water. The temperature of the air decreases as the air rises because of adiabatic expansion of the air, where, in this case, the air becomes warmer relative to the surrounding atmosphere, because latent heat of the water vapor is released when the water vapor in the air condenses. This effect occurs more effectively, when additional ice forming nuclei or condensation nuclei, for example, AgI, dry-ice or water droplets, etc. are artificially added to the air. It is possible to move the apparatus to a place where the weather conditions are optimum by providing the apparatus with a means for driving on the seas. It is also possible to drive the apparatus by utilizing the reaction force of the air exhausted through the air outlet. Another possible installation site would be a subtropical desert. Air heated by solar radiation may be used by, for example, utilizing a heat accumulator in order to effectively use the solar energy abundant in an arid region. In this case, the apparatus may be provided with a means for heating and/or humidifying air by utilizing the heat from the heat accumulator, and a means for transporting the heat accumulator between a region for heating the accumulator and the means for heating and/or humidifying the air For example, water can be used as a heat accumulator and a water channel with a pump can be used as a transportation means. It is best to minimized the lose of heat, for example, by covering the vessel with a reflection film for reflecting infrared radiation, such as a film of tin oxide or zinc oxide.

As described above, according to this invention, a container of great height can be realized by constructing a membrane structure with sufficient rigidity, or a plurality of interconnected membrane structures. Such a container can be utilized for the large scale generation of electric power from heated and/or humidified air.

I claim:

1. An apparatus for use in artificial wind power generation, comprising:
   a container structure defining therein a vertically extending container area adapted to contain air, said container structure having an air inlet opening at a bottom portion thereof fluidically communicating a bottom end of said container area with an exterior of said container structure to allow heated and/or humidified air to be introduced into said container area, and an air outlet opening at a top portion thereof fluidically communicating a top end of said container area with the exterior of said container structure to allow air contained in said container area to flow from said container area;
   wherein said air inlet opening, said container area and said air outlet opening together define an air flow path;
   wherein a wind power conversion means is disposed in said air flow path for producing a mechanical movement as air flow through said flow path;
   wherein an electric power generation means is operably connected to said wind power conversion means for generating electric power from the mechanical movement produced by said wind power conversion means; and
   wherein said container structure is constructed of a plurality of mutually interconnected individually gas-tight membrane cells.

2. An apparatus as recited in claim 1, wherein said wind power conversion means is disposed at said air outlet opening.

3. An apparatus as recited in claim 1, wherein said membrane cells are pressurized by a gas.

4. An apparatus as recited in claim 1, wherein said membrane cells form walls which surround and define a periphery of said container area.

5. An apparatus as recited in claim 1, wherein at least one additional vertically extending container area is defined in said container structure.

6. An apparatus as recited in claim 5, wherein said at least one container structure has at least one additional inlet opening at the bottom portion thereof respectively fluidically communicating a lower end of said at least one additional container area with the exterior of the container structure, and at least one additional outlet opening at the top portion of said container structure respectively fluidically communicating a top end of the at least one additional container area with the exterior of said container structure.

* * * * *